(12) United States Patent
Rhodes et al.

(10) Patent No.: US 8,315,560 B2
(45) Date of Patent: *Nov. 20, 2012

(54) UNDERWATER NAVIGATION

(75) Inventors: Mark Rhodes, Edinburgh (GB); Derek Wolfe, West Lothian (GB); Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/686,506

(22) Filed: Jan. 13, 2010

(65) Prior Publication Data

US 2010/0110835 A1  May 6, 2010

Related U.S. Application Data

(63) Continuation of application No. 11/454,630, filed on Jun. 15, 2006, now Pat. No. 7,711,322.

(60) Provisional application No. 60/690,964, filed on Jun. 15, 2005, provisional application No. 60/690,966, filed on Jun. 15, 2005, provisional application No. 60/690,959, filed on Jun. 15, 2005.

(30) Foreign Application Priority Data

Feb. 7, 2006 (GB) .................................. 0602398.0

(51) Int. Cl.
*H04B 13/02* (2006.01)

(52) U.S. Cl. ..................... 455/40; 455/456.1; 455/404.2; 455/431; 455/96; 455/98; 455/502; 367/132; 367/901; 367/142; 367/904; 340/850; 340/572.7; 343/719

(58) Field of Classification Search ............. 455/40, 455/427, 456.1, 12.1, 406, 431, 404.2, 72, 455/96, 98, 502; 367/131, 3; 340/572.7; 342/357.09
See application file for complete search history.

(56) References Cited

U.S. PATENT DOCUMENTS

| 3,903,520 A | * | 9/1975 | Shostak | 342/22 |
| 3,965,474 A | | 6/1976 | Guerrino et al. | 343/719 |
| 4,458,248 A | | 7/1984 | Lyasko | 343/719 |
| 4,799,825 A | | 1/1989 | Meyerhoff et al. | 405/188 |
| 5,047,990 A | | 9/1991 | Gafos et al. | 367/6 |
| 5,295,119 A | * | 3/1994 | Sarac | 367/99 |
| 5,513,930 A | * | 5/1996 | Eathorne | 114/222 |
| 5,579,285 A | * | 11/1996 | Hubert | 367/133 |

(Continued)

FOREIGN PATENT DOCUMENTS

CA 2441882 3/2005

(Continued)

OTHER PUBLICATIONS

Feezore et al, IEEE Journal of Oceanic Engineering vol. 26 No. 4 Oct. 2001, Oct. 1, 2001, An interface system for autonomous undersea vehicles.

*Primary Examiner* — Marceau Milord
(74) *Attorney, Agent, or Firm* — Paul Davis; Goodwin Procter LLP (57) ABSTRACT

An underwater navigation system comprising a transmitter having an electrically insulted magnetic coupled antenna for transmitting an electromagnetic and/or magneto-inductive signal, a receiver having an electrically insulated magnetic coupled antenna for receiving an electromagnetic and/or magneto-inductive signal from the transmitter, and determining means for determining the position of the receiver relative to the transmitter using the received electromagnetic and/or magneto-inductive signal.

15 Claims, 10 Drawing Sheets

U.S. PATENT DOCUMENTS

| | | | |
|---|---|---|---|
| 5,598,152 A | 1/1997 | Scarzello et al. | 340/850 |
| 5,640,369 A * | 6/1997 | Capell, Sr. | 367/88 |
| 5,668,775 A * | 9/1997 | Hatteland | 367/19 |
| 5,729,134 A * | 3/1998 | Lavan et al. | 324/239 |
| 5,894,450 A | 4/1999 | Schmidt et al. | 367/134 |
| 6,016,119 A * | 1/2000 | Krasner | 342/357.34 |
| 6,029,515 A | 2/2000 | Lahteenmaki et al. | 73/178 |
| 6,058,071 A | 5/2000 | Woodall et al. | 367/3 |
| 6,125,080 A | 9/2000 | Sonnenschein et al. | 367/134 |
| 6,130,859 A | 10/2000 | Sonnenschein et al. | 367/134 |
| 6,154,179 A | 11/2000 | Kohno | 343/719 |
| 6,472,983 B1 * | 10/2002 | Grunder | 340/540 |
| 6,483,865 B1 | 11/2002 | Beierle | 375/130 |
| 6,510,106 B2 | 1/2003 | Hudson | 367/127 |
| 6,534,985 B2 * | 3/2003 | Holladay et al. | 324/334 |
| 6,665,631 B2 * | 12/2003 | Steinbrecher | 702/159 |
| 6,677,757 B2 | 1/2004 | Fine et al. | 324/360 |
| 6,762,678 B2 * | 7/2004 | Arens | 340/506 |
| 6,771,563 B1 * | 8/2004 | Bernard | 367/131 |
| 6,807,127 B2 * | 10/2004 | McGeever, Jr. | 367/128 |
| 6,864,826 B1 * | 3/2005 | Stove | 342/22 |
| 6,865,139 B2 | 3/2005 | Hudson | 367/131 |
| 6,941,226 B2 * | 9/2005 | Estep | 701/213 |
| 6,967,574 B1 * | 11/2005 | Nelson | 340/551 |
| 7,148,691 B2 | 12/2006 | Nelson et al. | 324/326 |
| 7,190,634 B2 * | 3/2007 | Lambert et al. | 367/128 |
| 7,233,795 B1 * | 6/2007 | Ryden | 455/445 |
| 7,236,426 B2 * | 6/2007 | Turner et al. | 367/88 |
| 7,236,880 B2 * | 6/2007 | Fager et al. | 701/209 |
| 7,379,388 B2 * | 5/2008 | Graham et al. | 367/118 |
| 7,382,687 B2 * | 6/2008 | Doolan | 367/118 |
| 7,447,117 B2 * | 11/2008 | Yang | 367/134 |
| 7,466,992 B1 * | 12/2008 | Fujisaki | 455/556.1 |
| 7,487,043 B2 * | 2/2009 | Adams | 701/300 |
| 7,496,002 B2 | 2/2009 | Vosburgh | 367/188 |
| 7,626,499 B2 * | 12/2009 | Burneske et al. | 340/539.13 |
| 7,711,322 B2 * | 5/2010 | Rhodes et al. | 455/40 |
| 2004/0042342 A1 | 3/2004 | Hudson | 367/131 |
| 2005/0099891 A1 | 5/2005 | Protoolis et al. | 367/118 |

FOREIGN PATENT DOCUMENTS

| | | |
|---|---|---|
| EP | 1348139 | 3/2001 |
| EP | 1891457 | 12/2006 |
| GB | 2163029 A | 2/1986 |
| WO | WO 8704028 | 7/1987 |
| WO | 01/95529 | 12/2001 |

* cited by examiner

UNDERWATER NAVIGATION

CROSS-REFERENCE TO RELATED APPLICATIONS

This application is a continuation of U.S. Ser. No. 11/454,630 filed Jun. 15, 2006 now U.S. Pat. No. 7,711,322, which application claims the benefit of U.S. Ser. Nos. 60/690,964, 60/690,966 and 60/690,959, all filed Jun. 15, 2005, and is a continuation in part of GB0602398.0, filed Feb. 7, 2006, all of which applications are fully incorporated herein by reference.

FIELD OF USE

The present invention relates to an underwater navigation system. In particular, the invention relates to the use of underwater electromagnetic propagation to determine a receiver's position relative to a beacon or distributed assembly of beacons.

BACKGROUND

Underwater navigation has typically been accomplished using inertial navigation or acoustic beacons. Acoustic systems are degraded by noise and interference from a number of sources. They are also subject to multi-path effects and in some environments are virtually unusable. Inertial navigation systems are complex, bulky, high cost, accumulate inaccuracy over time and require knowledge of an initial reference point.

U.S. Pat. No. 6,865,139 describes a sub-sea navigation system that uses electromagnetic transmission. This has a plurality of antennas located at known positions on a sub-sea structure. Each antenna is electrically coupled and includes a cathodic protection anode. Signals emitted by the antennas are used by a detection means on a sub-sea vehicle to allow the vehicle to navigate relative to the sub-sea structure. The detection means uses a measure of the electric field of the emitted signals in order to determine the position of the vehicle. A problem with the system of U.S. Pat. No. 6,865,139 is that the signals emitted by the electrically coupled antennas are subject to high near field attenuation and the receive antennas have low efficiency. This reduces the range over which position can be determined and limits the applicability of the system. Also, there is little information provided on how exactly the position is determined using the measure of electric field.

SUMMARY OF THE INVENTION

According to one aspect of the present invention, there is provided an underwater navigation system comprising: a transmitter having an electrically insulated magnetic coupled antenna for transmitting an electromagnetic signal, a receiver having an electrically insulated magnetic coupled antenna for coupling the magnetic component of an electromagnetic signal from the transmitter, and means for determining the position of the receiver relative to the transmitter using the received electromagnetic signal.

Using electrically insulated magnetic coupled antennas provides various advantages over the electrically coupled antennas used in U.S. Pat. No. 6,865,139. In far field electromagnetic propagation, the relationship between the electric and magnetic field is determined by the transmission media's characteristic impedance. An electrically coupled antenna launches a predominantly electric field that transitions to the characteristic impedance over an area known as the near field. Underwater attenuation is largely due to the effect of conduction on the electric field. Since electrically coupled antennas produce a higher E-field component, in the near field the radiated signal experiences higher attenuation. The same performance issues apply to a receive antenna. Magnetic coupled antennas do not suffer from these problems and so are more efficient under water than electrically coupled antennas. Using an electrically insulated antenna provides further advantages. This is because for a non-insulated electrically coupled antenna, there is a direct conduction path between it and the dissipative water. This leads to dissipation as the signal propagates along the antenna even before the electromagnetic signal is launched. Providing an insulated antenna reduces this effect.

The means for determining the position of the receiver may be operable to determine the distance of the receiver from the transmitter and/or the direction of the receiver relative to the transmitter. These may be determined using signal strength at the receiver and/or the direction of signal propagation at the receiver and/or the time taken for a signal to travel between the transmitter and the receiver.

The signal strength may be used to determine proximity based on strength of received signal for a given transmitter power and propagation characteristics. To this end, means are provided for measuring the strength or magnitude of the received signals. For most applications calculation of the receiver's range to the transmitter can be based on a typical physical model of the underwater environment. This model could be improved by measurement of attenuation using a comparison of signal strength between multiple antennas with known relative positions within the navigating station.

The direction of signal propagation may be determined by alignment of a highly directional antenna or based on comparison of the field strength received by several antennas distributed in space. In the latter case, because of the high attenuation per meter experienced in water, a local loss gradient vector can be established by comparison of field strength measured from the multiple antennas. Attenuation will be measurable within the dimensions of a typical mobile vehicle.

The transmitter and receiver may be operable to simultaneously provide a communication links.

According to another aspect of the present invention, there is provided an underwater navigation system comprising: a transmitter for transmitting an electromagnetic signal, a navigation station having receiving means for receiving a signal from the transmitter, and determining means for determining the position of the station using signals received by the receiving means at three or more different positions.

By using signals received at a plurality of different receiver positions, the position of the navigation station can be determined relative to a single transmitter. This reduces the number of beacons required and allows applications where location of an isolated object is required rather than the distributed objects required by a multiple transmit antenna system.

The receiving means may comprise three or more spatially separated receivers. In this case, the determining means may be operable to determine the position of the station using a signal from each of the receivers. An advantage of this is that the measurements can be taken simultaneously.

The receiving means may include a single antenna. To determine the position of the station, the antenna would be moved to three or more different measurement positions. This could be done either by moving the station or by moving the antenna. In this latter case, the antenna could be provided at the end of a rotating arm. In any case, an inertial navigation system could provide accurate short-term knowledge of the relative position of successive measurements as the vehicle moves through the water. Position relative to the beacon may then be determined using standard trigonometry.

The means for determining may be operable to determine the directional position of the receiver using the magnitude of the field at the plurality of receiver positions.

The means for determining the position may be operable to determine proximity to the transmitter using the magnitude of the signal received at one or more receiver positions.

The transmitter may include an electrically insulated magnetic coupled antenna for transmitting an electromagnetic signal.

The receiver may include an electrically insulated magnetic coupled antenna for receiving an electromagnetic signal from the transmitter.

According to another aspect of the present invention, there is provided an underwater navigation system comprising: a transmitter for transmitting an electromagnetic signal, a receiver for receiving a signal from the transmitter, and means for determining the position of the receiver using the magnitude of the received signal.

According to yet another aspect of the present invention, there is provided a system for determining underwater electromagnetic signal propagation direction comprising at least one receiver for receiving the electromagnetic signal and determining means for determining the direction of propagation using field strength at three or more receiver locations.

Three or more receiver antennas may be provided and the determining means may be operable to determine the direction of propagation by comparison of the field strength received at each antenna.

Alternatively, a single receiver antenna may be provided and the determining means may be operable to determine the direction of propagation by comparison of the field strength received at three or more different receiver locations.

BRIEF DESCRIPTION OF DRAWINGS

Various aspects of the invention will now be described by way of example only and with reference to the accompanying drawings, of which.

Figure 1:
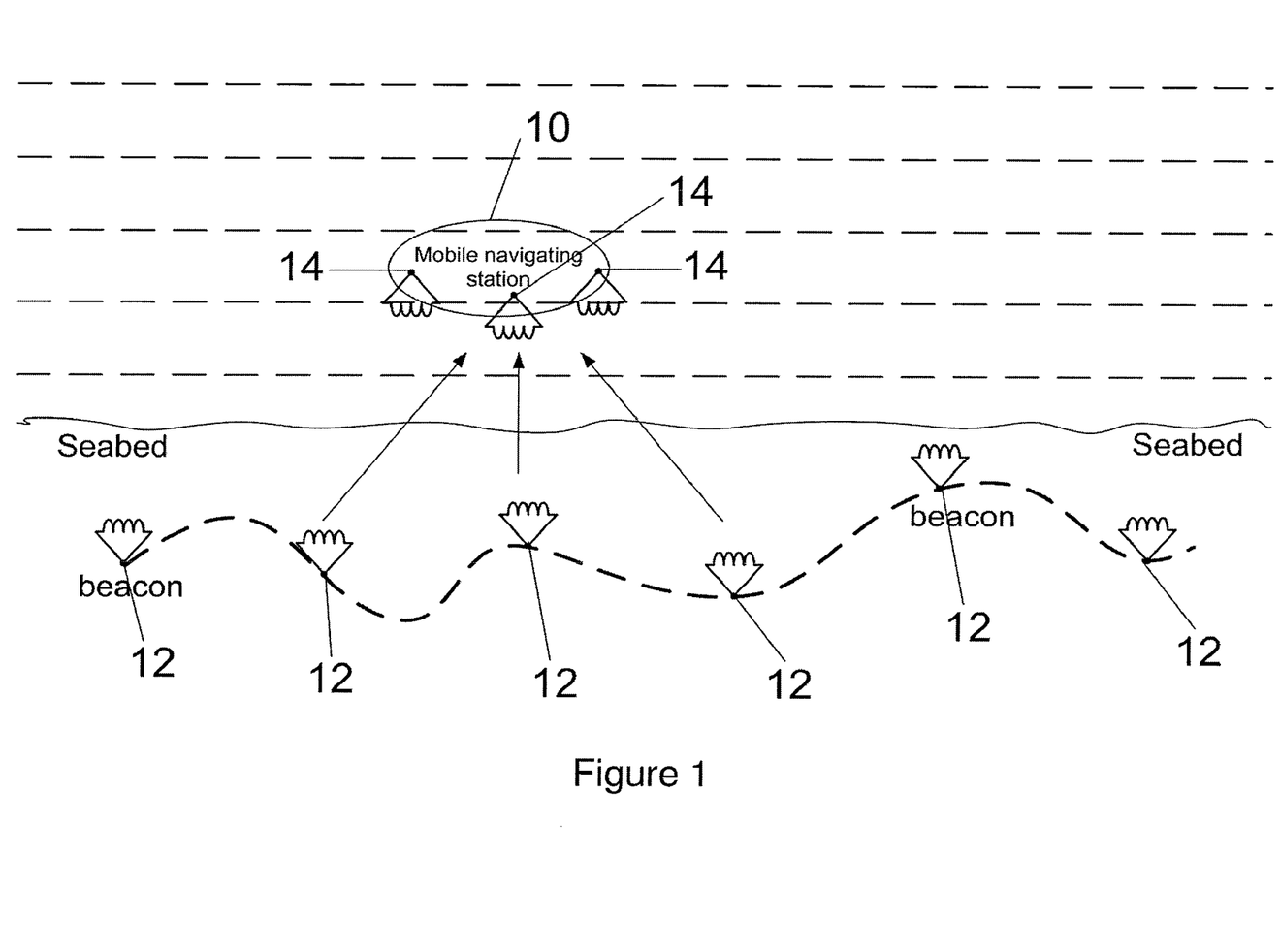
FIG. 1 is a block diagram of an underwater navigation system.

FIG. 1 shows a mobile navigating station 10 that is operable to navigate around an underwater environment using magnetic radiation transmitted between one or more fixed position beacons 12 and at least one receiver 14 carried on the mobile station 10. Due to the short range nature of underwater electromagnetic propagation, if a signal is detectable above a given threshold the receiver's 14 position is known to be in close proximity to the transmitting beacon 12. To allow the navigating station 10 to differentiate between individual sources in a multi-beacon environment, the transmitting beacons 12 may produce an identifying signal. For example, each transmitter 12 may broadcast on a different frequency. Alternatively, each transmitter 12 may encode some form of identifying modulation.

Figure 2:
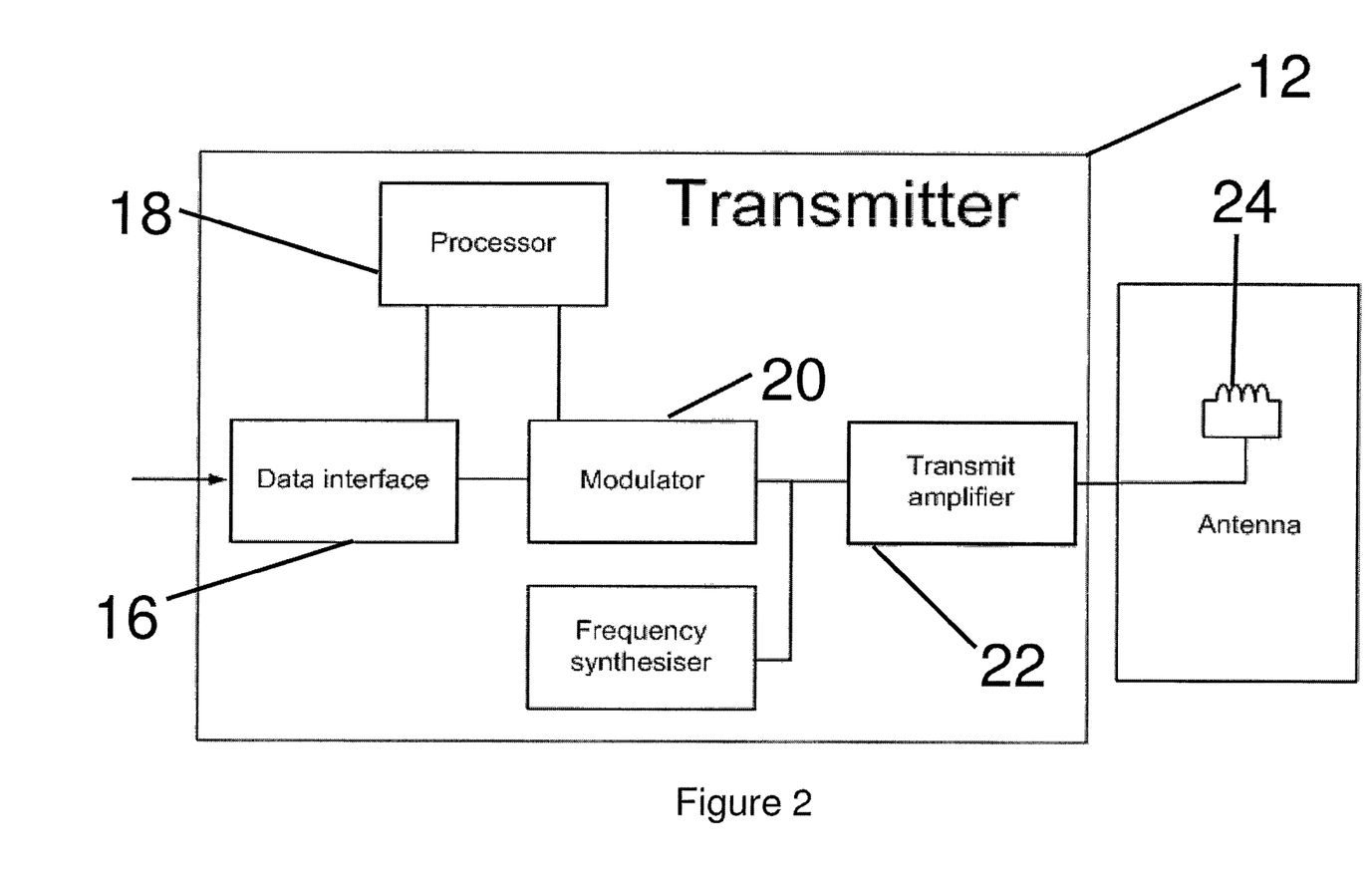
FIG. 2 is a block diagram of an underwater transmitter for use in the underwater navigation system of FIG. 1.

FIG. 2 shows an example of a transmitter or beacon 12 for use in the mobile station 10 of FIG. 1. This has a data interface 16 that is connected to each of a processor 18 and a modulator 20. The modulator 20 is provided to encode data onto carrier wave. At an output of the modulator 20 is a transmit amplifier 22, which is connected to an underwater, electrically insulated magnetic coupled antenna 24. In use, the processor 20 is operable to cause electromagnetic navigation signals to be transmitted at regular intervals or in response to an external signal, for example from the mobile station 10. These magnetic signals can be received and used as a guide or navigational aid by any mobile station 10 in the vicinity.

Figure 3:
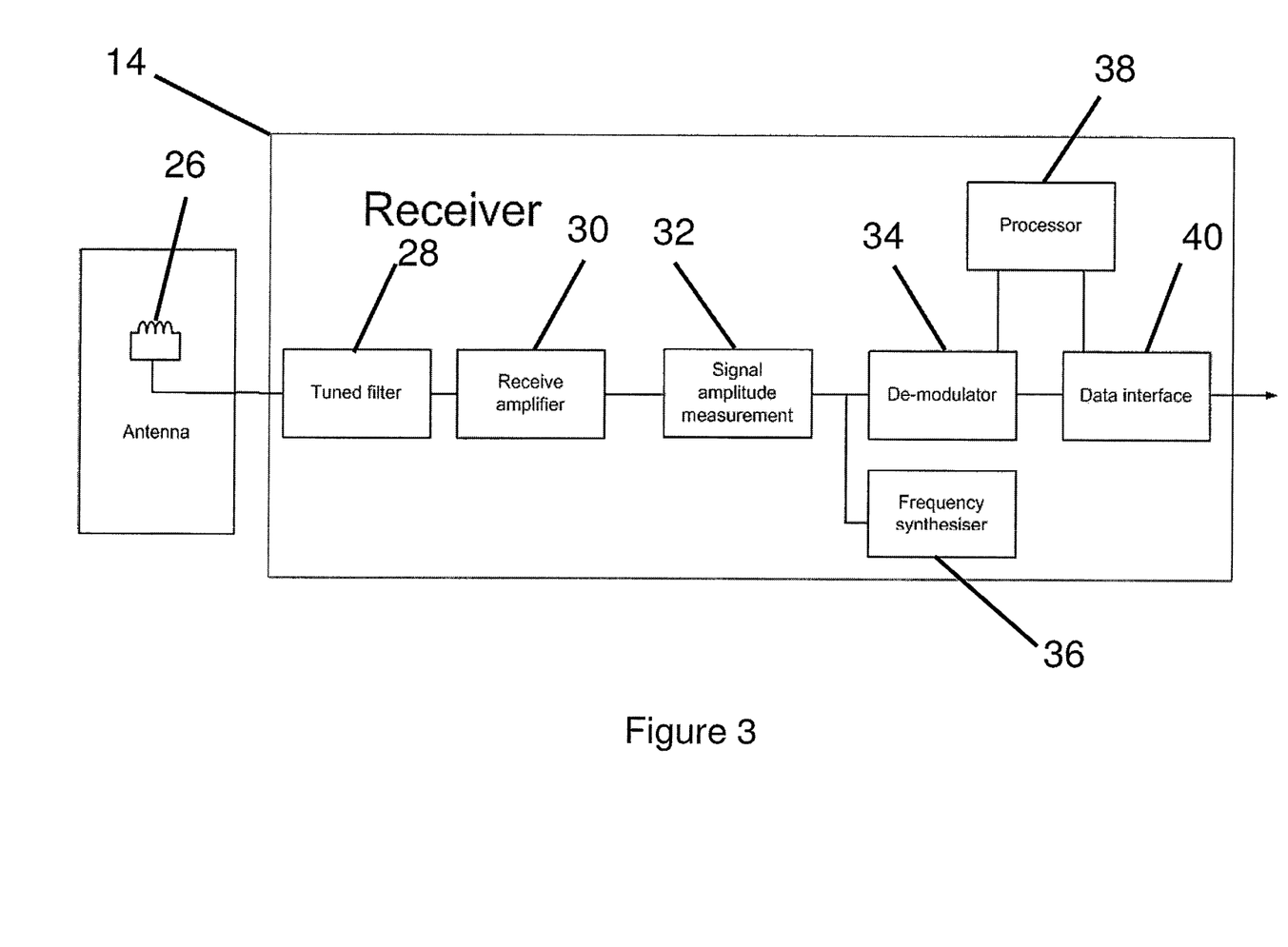
FIG. 3 is a block diagram of an underwater receiver for use in the navigation system of FIG. 1.

FIG. 3 shows an example of a receiver for use in the mobile station of FIG. 1. This has an electrically insulated magnetic coupled antenna 26 adapted for underwater usage. This antenna 26 is operable to receive magnetic field signals from the transmitter antenna 24. Connected to the antenna 26 is a tuned filter 28 that is in turn connected to a receive amplifier 30. At the output of the amplifier 30 is a signal amplitude measurement module 32 that is coupled to a de-modulator 34 and a frequency synthesiser 36 that provides a Local Oscillator signal for down conversion of the modulated carrier. Connected to the de-modulator 34 is a processor 38 that is in turn connected to a data interface 40. The data interface 40 is provided for transferring data from the receiver to a control or monitoring means, which may be located in the mobile device 10 or at another remote location.

Figure 4:
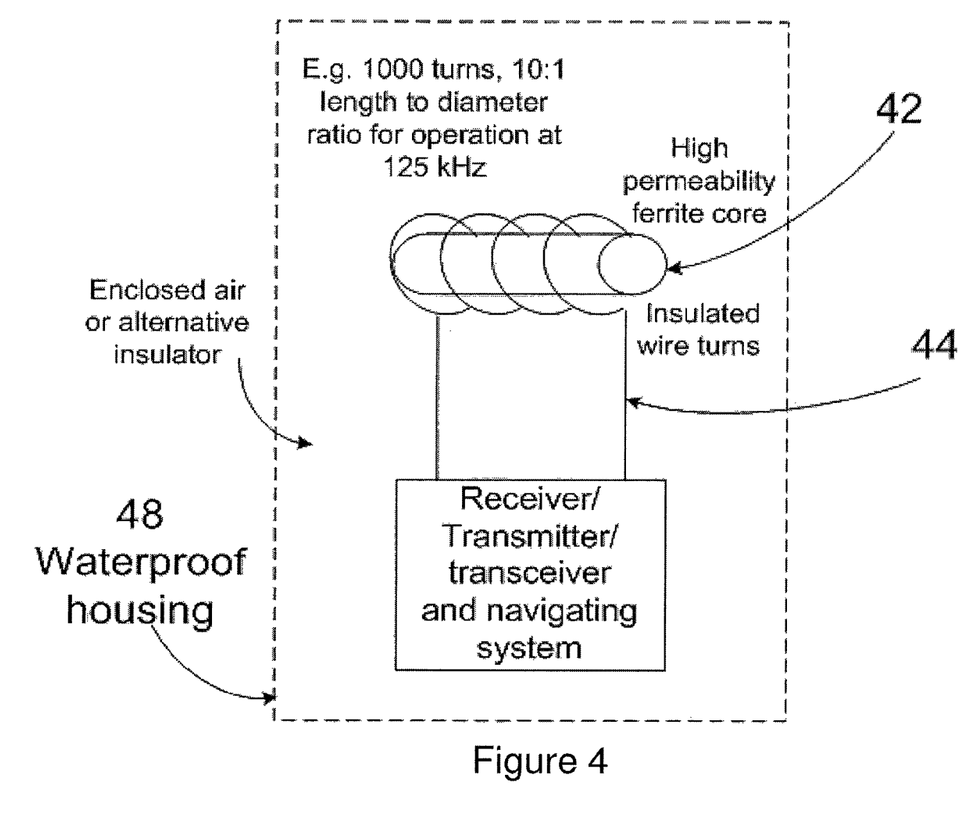
FIG. 4 is a diagrammatic representation of a magnetically coupled solenoid antenna in a waterproof enclosure for use in the transmitter of FIG. 2 and the receiver of FIG. 3.

FIG. 4 shows an example of an electrically insulated, magnetic coupled antenna that can be used in the transmitter 12 and receiver 14 of FIGS. 2 and 3. This has a high permeability ferrite core 42. Wound round the core 42 are multiple loops of an insulated wire 44. The number of turns of the wire 44 and length to diameter ratio of the core 42 can be selected depending on the application. However, for operation at 125 kHz, one thousand turns and a 10:1 length to diameter ratio is suitable. The antenna 24, 26 is connected to the relevant transmitter or receiver and is included in a waterproof housing 48. Within the housing 48 the antenna may be surrounded by air or some other suitable insulator, for example, an impedance matched low conductivity medium such as distilled water.

In use, the receiver 14 is operable to receive signals from the transmitter 12 and use these to determine an indication of its own, relative position. In some circumstances, merely being in range of a transmitter 12 may provide enough information. However, if more detailed information is needed, such as the actual distance from the transmitter 12, the receiver 14 may be operable to use the strength of the received signal. In this case, information would have to be stored on the expected strength of a received signal for a given transmitter power and propagation characteristics as a function of distance. For most applications calculation of the receiver's range to the transmitter can be based on a typical physical model of the underwater environment (e.g. expected loss versus range). This model could be improved by measurement of attenuation using a comparison of signal strength between multiple receiver antennas with known relative position within the navigating station.

Figure 5:
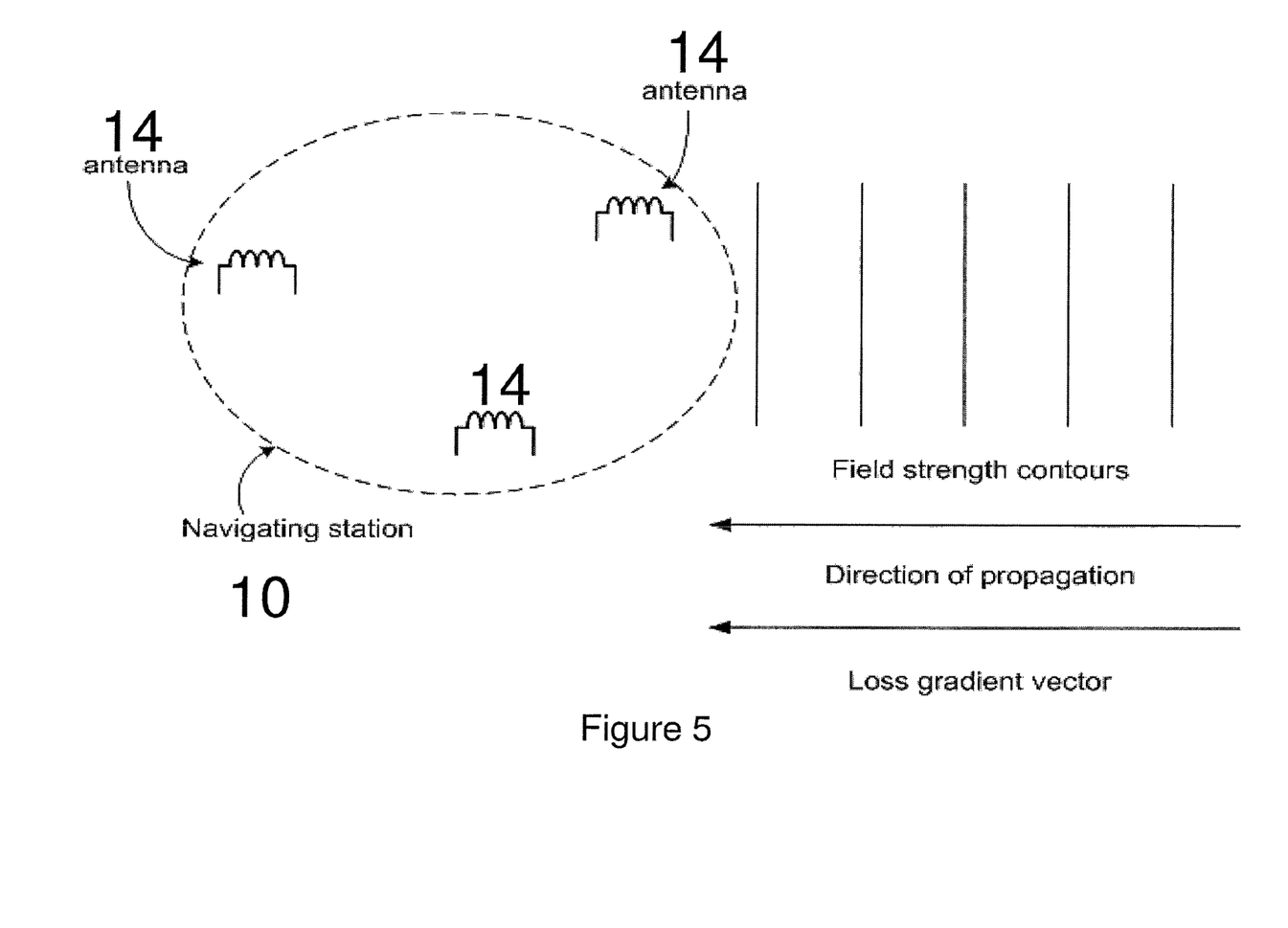
FIG. 5 is a diagrammatic representation of a direction finding technique.
Figure 6:
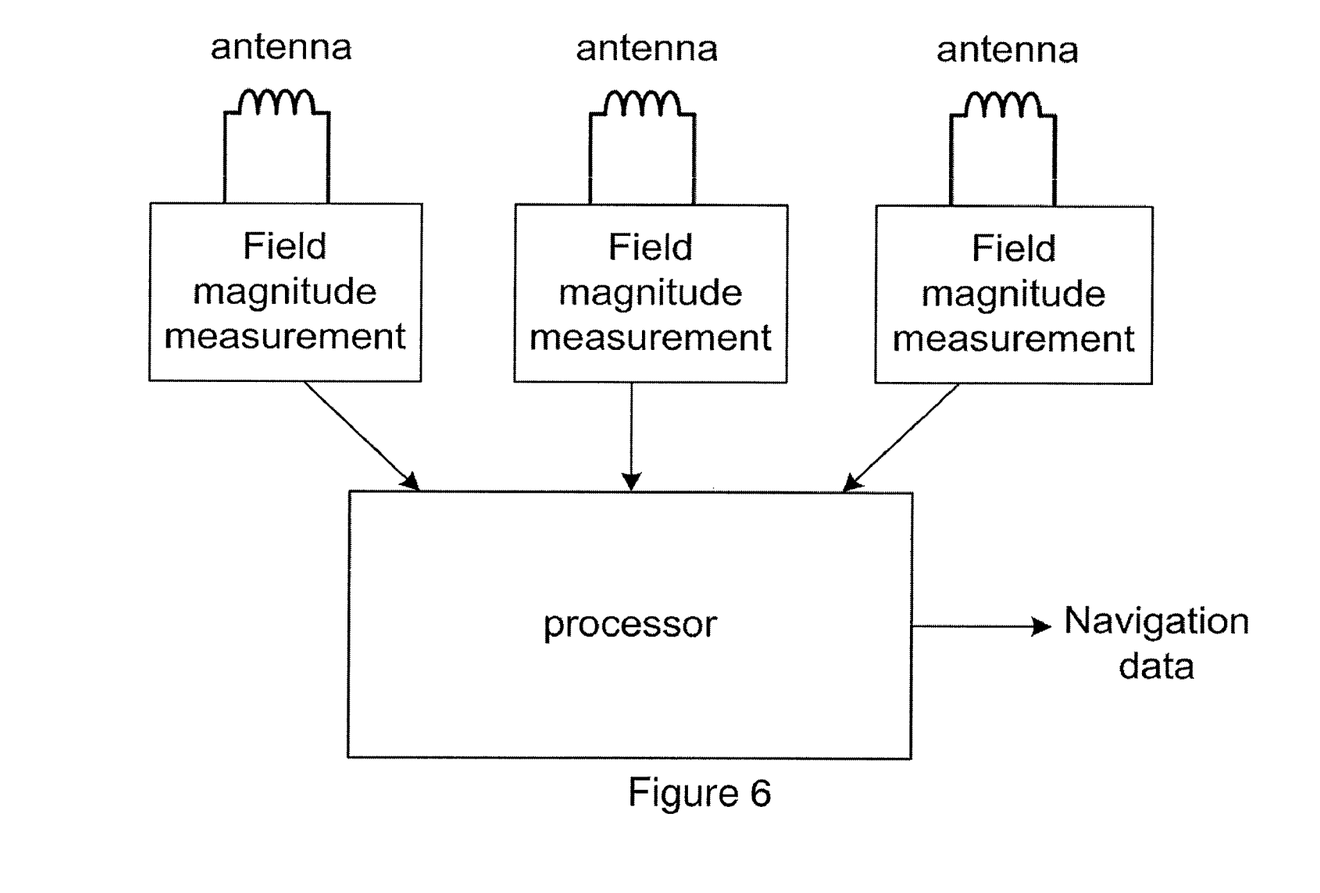
FIG. 6 is a block diagram of a receiver arrangement for use in the technique of FIG. 5.

The system of FIGS. 1 to 4 allows a measure of the proximity of a mobile station 10 to one or more beacons 12, but not the relative direction. To determine the direction, a direction finding system can be used. This is illustrated in FIG. 5. In this case, all three antennas 14 distributed across the hull of the navigating station 10 are used. The strength of an electromagnetic signal emitted from a beacon 12 is measured at each antenna 14 and made available to a processor in the station, as shown in FIG. 6. Because the field strength is attenuated in the direction of propagation, the position of the station 10 relative to that beacon 12 can be determined by calculating a local two-dimensional loss gradient vector using a comparison of the field strength at the three antennas. Attenuation will be measurable within the dimensions of a typical mobile station 10 that might, for example, accommodate three antennas 14 at the vertices of an equilateral triangle with, for example a separation of two meters. The loss vector can be calculated by simple geometry using an algorithm executed by the navigation station processor. A positional fix may be obtained by using the loss gradient as an angular bearing relative to several distributed transmitting beacons 12. Alternatively, the loss gradient vector can be used to navigate with respect to an individual transmission source 12. For three-dimensional bearing fixes, four antennas 14 arranged with three-dimensional spacing would be required.

As an alternative to using three receiver antennas, a single receiver antenna could be used and merely moved between three or more different measurement positions. The antenna could be moved between the measurement positions by movement of the navigations station and/or using a mechanism for moving it independently of the station. As an example of a suitable mechanism, the antenna may be provided on a rotatable arm.

Figure 7:
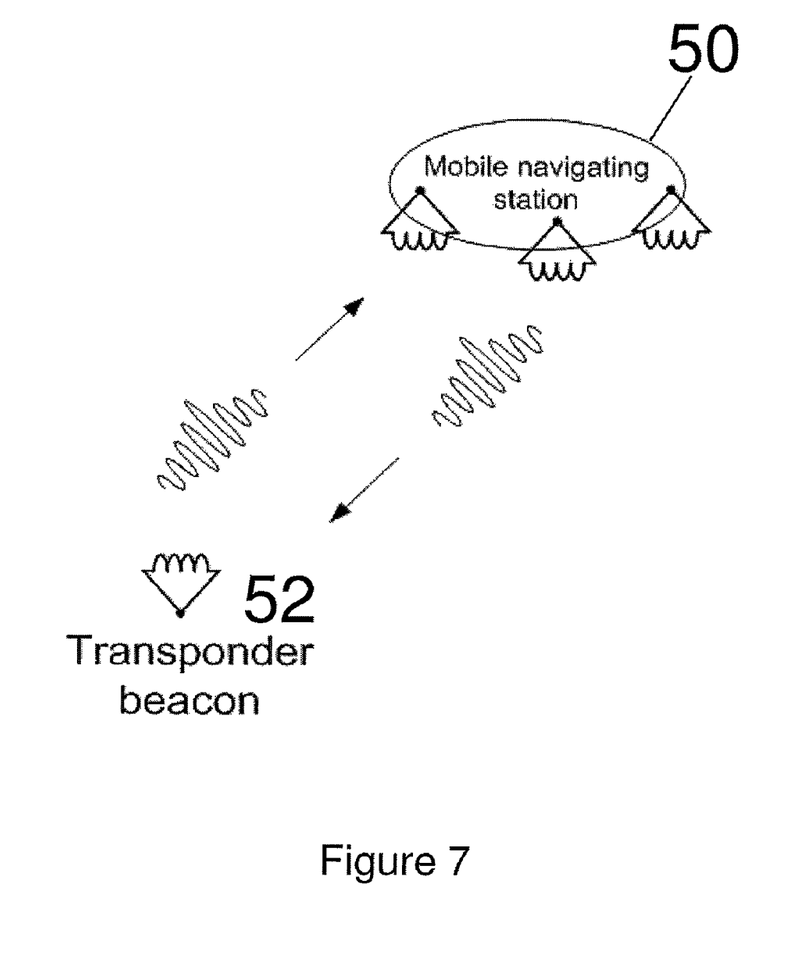
FIG. 7 is a diagrammatic representation of a range finding technique

FIG. 7 illustrates another method of determining relative position. This is based on measurement of propagation time between the navigating station 50 and a beacon 52. In this case, the navigating station 50 transmits a pulse that is received by a transponder beacon 52 and re-transmitted with an accurately controlled time delay. The navigating station 50 receives the signal from the transponder 52 and calculates its relative range based on the round trip timing. To implement this method, the velocity of propagation has to be known. This may be determined by comparison of timings between multiple antennas of known spacing within the navigating station or based on a model of the propagating medium.

Figure 8:
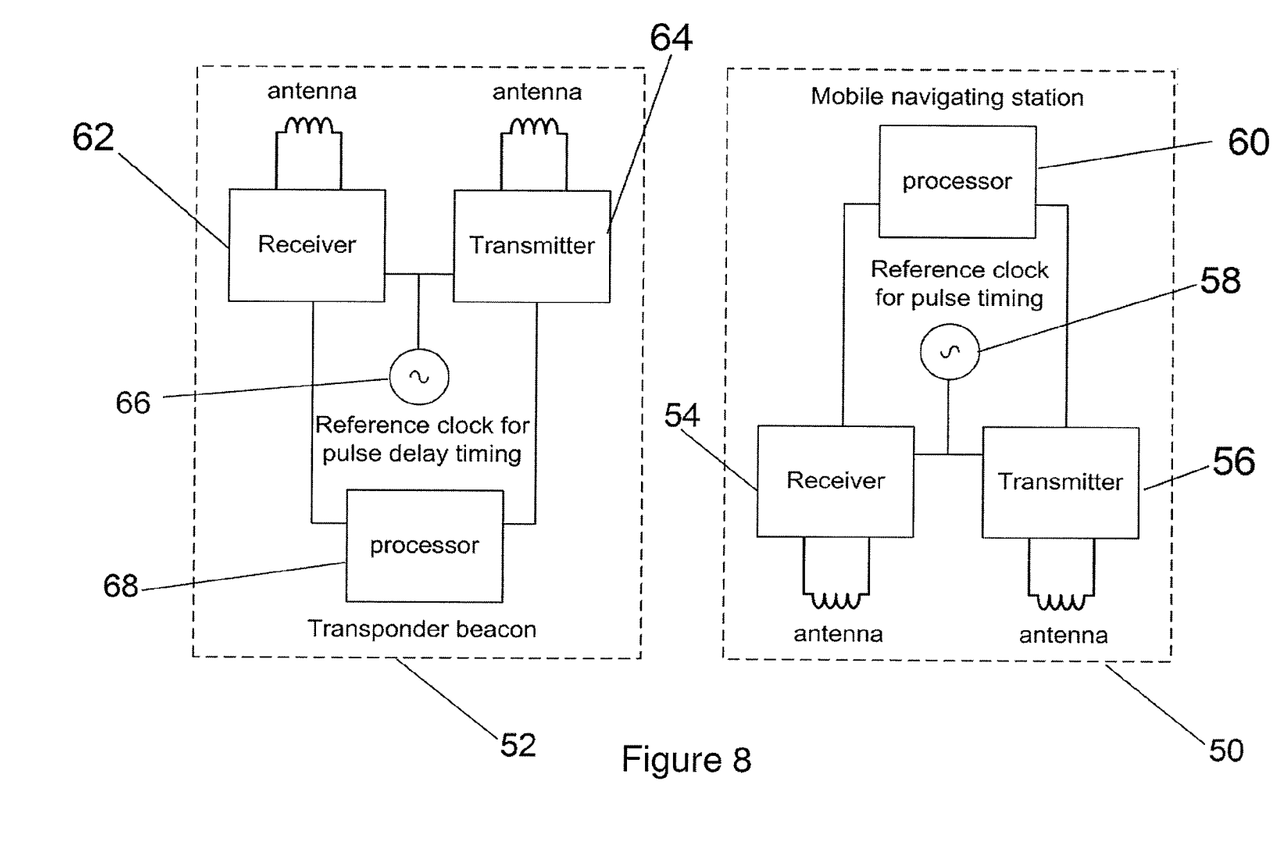
FIG. 8(a) is a block diagram of a transponder for use in the range finding technique of FIG. 7.
FIG. 8(b) is a block diagram of a navigation station for use in the range finding technique of FIG. 7.

FIGS. 8(a) and (b) illustrate a navigation station 50 and a transponder beacon 52 for implementing the method of FIG. 7. Both the navigation station 50 and the transponder beacon 52 have a receiver 54, 62, a transmitter 56, 64, a clock 58, 66 and a control processor 60, 68, and both know or have access to a pre-determined time delay. When the navigation station 50 wants to know its position relative to a beacon 52, its processor 60 causes the transmitter to transmit a signal. Simultaneously with transmitting the signal, the station clock 58 is started. When a signal is received at the transponder beacon 52, its processor 68 waits for the pre-determined time, before sending a return signal to the navigation station 50. When the return signal is subsequently received at the navigation station 50 the internal clock 58 is used to determine the round trip time. Because the pre-determined time, the velocity of propagation and the round trip time are known, the station processor 60 is able to calculate the distance between the station 50 and the beacon 52.

Figure 9:
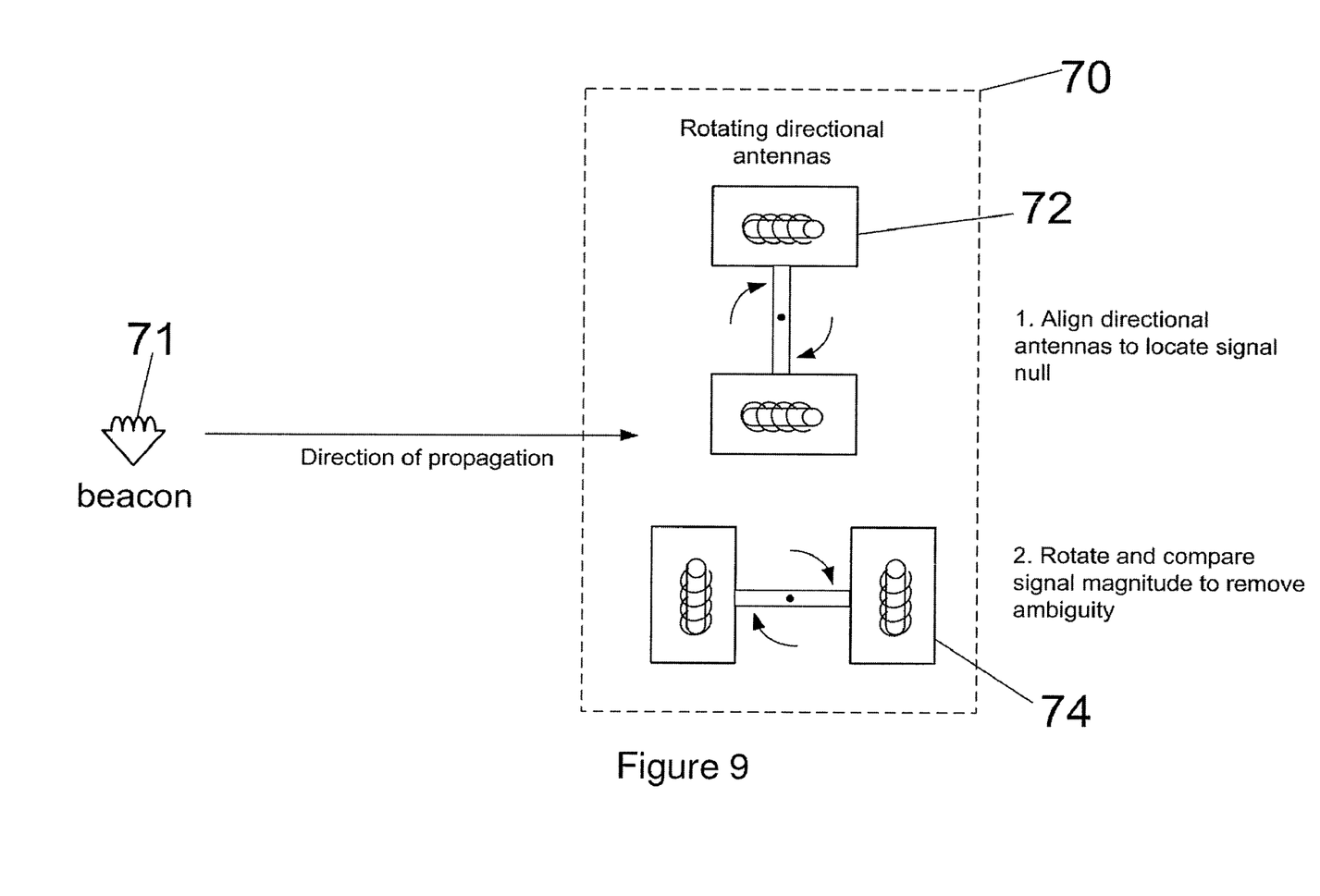
FIG. 9 is a diagrammatic representation of another direction finding technique.
Figure 10:
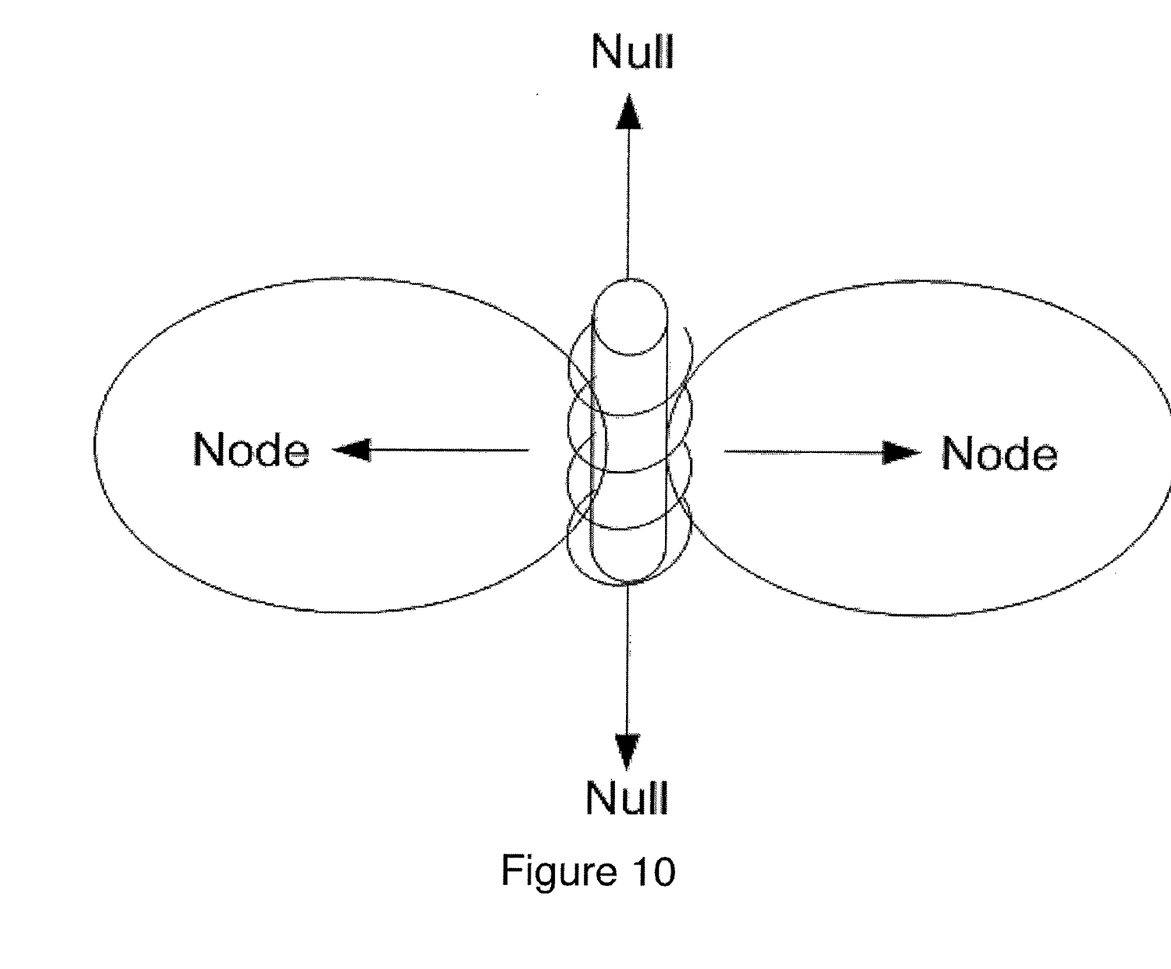
FIG. 10 is a diagrammatic representation of the field pattern produced by a magnetically coupled solenoid antenna.

FIG. 9 shows another navigation system based on a mobile navigation station 70 and a transponder beacon 71. In this case, the navigation station 70 includes a highly directional antenna 72, such as a multiple turn solenoid wound around a ferrite rod. This type of antenna 72 generates a radiation pattern with a null point aligned to waves propagating along the axis of the rod as illustrated in FIG. 10. The antenna 72 could be rotated until a minimum is located in the received signal strength. As will be appreciated, a single antenna of this type would result in a 180 degree ambiguity. This can be resolved by comparing the signal strength from a second antenna 74 located at some distance from the first to establish the approximate direction of the loss gradient.

For any of the radio transmitter and receiver navigation systems described above, the navigation beacon could remain in receive mode until it decodes a valid demand signal transmitted by the navigating station. An advantage of this is that the beacons would remain covert. Also, this arrangement would reduce power consumption at remote beacon deployments thereby extending their operational life. Beacon and navigating stations both require transceivers for a system configuration of this type.

A skilled person will appreciate that variations of the disclosed arrangements are possible without departing from the invention. For example, although the beacons of FIG. 1 are shown in a line arrangement, it will be appreciated that they could equally be arranged in a two or three-dimensional grid. Additionally, the navigating beacons may be operable to communicate their absolute position in space with reference to a standard co-ordinate system, for example latitude, longitude and altitude, so that an absolute receiver position can be determined rather than merely a relative measure.

In addition to the functionality described above, the systems in which the invention is embodied could be used to implement communications links. Also, whilst the systems and methods described are generally applicable to seawater, fresh water and any brackish composition in between, because relatively pure fresh water environments exhibit different electromagnetic propagation properties from saline, seawater, different operating conditions may be needed in different environments. Any optimisation required for specific saline constitutions will be obvious to any practitioner skilled in this area. Accordingly the above description of the specific embodiment is made by way of example only and not for the purposes of limitation. It will be clear to the skilled person that minor modifications may be made without significant changes to the operation described.

The invention claimed is:

1. An underwater navigation system comprising a transmitter having an electrically insulated magnetic coupled antenna for transmitting an electromagnetic signal underwater, a receiver having an electrically insulated magnetic coupled antenna for receiving the underwater electromagnetic signal from the transmitter, and determining means for directly determining the position of the receiver relative to the transmitter using the received underwater electromagnetic signal, wherein the at least one of the transmitter and receiver is underwater, and the determining means are operable to: determine the distance of the receiver from the transmitter and/or the direction of the receiver relative to the transmitter; and use signal strength at the receiver and/or the direction of signal propagation at the receiver and/or the time taken for a signal to travel between the transmitter and the receiver.

2. An underwater navigation system as claimed in claim 1 wherein the determining means are operable to compare the received signal strength with a strength/distance model to determine a measure of the distance between the receiver and transmitter.

3. An underwater navigation system as claimed in claim 1 wherein each insulated antenna is surrounded by an impedance-matched low conductivity medium, for example distilled water.

4. An underwater navigation system as claimed in claim 1 wherein the receiver antenna is a directional antenna and the determining means are operable to use the directionality of the receiver to determine the relative directional position of the transmitter.

5. An underwater navigation system as claimed in claim 1 wherein the determining means are operable to determine the directional position of the transmitter using the field strength at three or more receiver positions.

6. An underwater navigation system as claimed in claim 1 wherein three or more receiver antennas are provided and the determining means are operable to determine the directional position of the transmitter by comparison of the field strength received at each antenna.

7. An underwater navigation system comprising: a transmitter for transmitting an underwater electromagnetic signal, a navigation station having receiving means for receiving the underwater electromagnetic signal from the transmitter, and determining means for directly determining the position of the station using the underwater electromagnetic signals received by the receiving means at three or more different positions, wherein the determining means are operable to determine the directional position of the receiver using the magnitude of the field, preferably averaged over at least one wave period, at the plurality of measurement positions.

8. An underwater navigation system as claimed in claim 7 wherein the receiving means comprise three or more spatially separated receivers, and the determining means are operable to determine the position of the station using a signal from each of the receivers.

9. An underwater navigation system as claimed in claim 7 wherein the receiving means include a single antenna and means for moving the antenna to three or more different measurement positions.

10. An underwater navigation system as claimed in claim 9 wherein the antenna is provided on a rotating arm.

11. An underwater navigation system as claimed in claim 7 wherein the determining means are operable to determine proximity to the transmitter using the magnitude of the signal received.

12. An underwater navigation system as claimed in claim 7 wherein the transmitter includes an electrically insulated magnetic antenna for transmitting an electromagnetic signal.

13. An underwater navigation system as claimed in claim 7 wherein the receiving means includes one or more electrically insulated magnetic antennas for receiving an electromagnetic signal from the transmitter.

14. A system for determining underwater electromagnetic signal propagation direction comprising at least one receiver for receiving the underwater electromagnetic signal and determining means for directly determining the direction of propagation using field strength at three or more receiver locations, wherein three or more receiver antennas are provided and the determining means are operable to determine the direction of propagation by comparison of the field strength received at each antenna.

15. A system for determining underwater electromagnetic signal propagation direction comprising at least one receiver for receiving the underwater electromagnetic signal and determining means for directly determining the direction of propagation using field strength at three or more receiver locations, wherein a single receiver antenna is provided and the determining means are operable to determine the direction of propagation by moving the antenna to three or more different locations.

* * * * *